United States Patent
Kwak

(10) Patent No.: US 8,430,463 B2
(45) Date of Patent: Apr. 30, 2013

(54) IMAGE FORMING APPARATUS AND METHOD OF TRANSMITTING SIGNAL

(75) Inventor: In-gu Kwak, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1319 days.

(21) Appl. No.: 11/944,483

(22) Filed: Nov. 23, 2007

(65) Prior Publication Data
US 2008/0297831 A1    Dec. 4, 2008

(30) Foreign Application Priority Data
Jun. 4, 2007    (KR) .................. 10-2007-0054461

(51) Int. Cl.
*B41J 29/38*    (2006.01)
(52) U.S. Cl.
USPC .................................................. 347/5
(58) Field of Classification Search .............. 347/5, 9
See application file for complete search history.

(56) References Cited

U.S. PATENT DOCUMENTS 6,726,298 B2 * 4/2004 Anderson et al. ................. 347/5
2007/0071113 A1 * 3/2007 Lee et al. ...................... 375/257

* cited by examiner

*Primary Examiner* — Julian Huffman
(74) *Attorney, Agent, or Firm* — Stanzione & Kim, LLP

(57) ABSTRACT

An image forming apparatus and a method of transmitting a signal. The image forming apparatus includes a main controller to convert a plurality of image signals corresponding to printing data into differential signals, and to combine the converted differential signals into a plurality of transmission signals, a printing engine unit to restore the image signal after the plurality of transmission signals are transmitted from the main controller, and a plurality of transfer cables to transmit the plurality of transmission signals between the main controller and the printing engine unit. The number of cables to transmit an image signal is reduced, which is economically efficient, additionally, the size of the image forming apparatus is minimized.

18 Claims, 4 Drawing Sheets

IMAGE FORMING APPARATUS AND METHOD OF TRANSMITTING SIGNAL

CROSS-REFERENCE TO RELATED APPLICATIONS

This application claims priority under 35 U.S.C. §119 (a) from Korean Patent Application No. 10-2007-0054461, filed on Jun. 4, 2007, in the Korean Intellectual Property Office, the disclosure of which is incorporated herein by reference in its entirety.

BACKGROUND OF THE INVENTION

1. Field of the Invention

The present general inventive concept relates to an image forming apparatus and a method for transmitting a signal. More particularly, the present general inventive concept relates to an image forming apparatus requiring a reduced number of cables to transmit an image signal and a method for transmitting a signal.

2. Description of the Related Art

An image forming apparatus prints an image corresponding to input image data on a recording medium such as a printing paper. An image forming apparatus includes a printer, a duplicator, or a facsimile.

Additionally, an image forming apparatus generally includes a main controller, a printing engine unit, and a cable to connect the main controller and the printing engine unit. The main controller converts printing data received from a host device into image data that is appropriate for printing, and transmits the converted image data to the printing engine unit through a cable in a serial data form. The printing engine unit processes a printing function that corresponds to the transmitted image data.

The image data includes a plurality of image signals that correspond to printing data. The number of cables required to transmit the image signal is decided according to the number of image signals.

Electro-magnetic interference (EMI) caused during transmission of image data has recently been reduced, and as a result the printing speed has increased. Additionally, the printing quality has improved, but an increased number of image signals to control the printing engine unit are required.

Hence, the number of cables required to transmit the image signal have increased, which is economically inefficient. Additionally, more space is occupied in the image forming apparatus due to the increase in the number of cables such that it is difficult to minimize the size of the image forming apparatus.

SUMMARY OF THE INVENTION

The present general inventive concept provides an image forming apparatus to convert an image signal into a low voltage differential signal, and to reduce the number of cables by combining and transmitting the converted low voltage differential signal, and a method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including a main controller to convert a plurality of image signals corresponding to printing data into differential signals, and to combine the converted differential signals into a plurality of transmission signals, a printing engine unit to restore the image signals after the plurality of transmission signals are transmitted from the main controller, and a plurality of transfer cables to transmit the plurality of transmission signals between the main controller and the printing engine unit, wherein the number of the combined transmission signals is less than the total number of differential signals.

The main controller may include a signal generating unit to convert the printing data into a plurality of image signals, a signal converting unit to convert the plurality of image signals into the differential signals using low voltage differential signaling (LVDS), and a signal transmitting unit to generate the plurality of transmission signals by combining the converted differential signals, and to distribute the transmission signals to a plurality of respective transfer cables.

The signal transmitting unit may combine two of the plurality of image signals to generate each of the transmission signals.

The printing engine unit may include a signal receiving unit to receive the transmission signals through the transfer cables, and a signal recovery unit to restore the received transmission signals into a plurality of image signals.

The plurality of image signals may include a first image signal, a second image signal, and a third image signal, the signal converting unit may convert the first image signal into a first 1+ differential signal and a first 1− differential signal, convert the second image signal into two second 2+ differential signals and two second 2− differential signals, and convert the third image signal into a third 3+ differential signal and a third 3− differential signal, and the signal transmission unit may combine the 1+ differential signal and one second 2+ differential signal to generate a first transmission signal, combine the first 1− differential signal and another second 2+ differential signal to generate a second transmission signal, combine the third 3+ differential signal and one second 2− differential signals to generate a third transmission signal, and combine the third 3− differential signal and another second 2− differential signal to generate a fourth transmission signal.

The signal recovery unit may include the first transmission signal and the second transmission signal to restore the first image signal, combine the first transmission signal to the fourth transmission signal to restore the second image signal, and combine the third transmission signal and the fourth transmission signal to restore the third image signal.

The foregoing and/or other aspects and utilities of the present general inventive concept may also be achieved by providing a method of transmitting a signal including converting a plurality of image signals corresponding to printing data into differential signals, combining the converted differential signals to a plurality of transmission signals, and restoring the image signal after the plurality of transmission signals are transmitted. The number of the combined transmission signals is less than the total number of differential signals.

The converting of the plurality of image signals may include converting the plurality of image signals into the differential signals using low voltage differential signaling.

The combining of the converted differential signals may include combining two of the plurality of image signals to generate each of the transmission signals.

The plurality of image signals may include a first image signal, a second image signal, and a third image signal, the converting of the plurality of image signals may include converting the first image signal into a first 1+ differential signal and a first 1− differential signal, converting the second image signal into two second 2+ differential signals and two second 2− differential signals, and converting the third image signal into a third 3+ differential signal and a third 3−differential signal, and the combining of the converted differential signal may include combining the first 1+ differential signal and one second 2+ differential signal to generate a first transmission signal, combining the first 1− differential signal and another second 2+ differential signal to generate a second transmission signal, combining the 3+ differential signal and one second 2− differential signal to generate a third transmission signal, and combining the third 3− differential signal and another second 2− differential signal to generate a fourth transmission signal.

The restoring of the image signal may include combining the first transmission signal and the second transmission signal to restore the first image signal, combining the first transmission signal to the fourth transmission signal to restore the second image signal, and combining the third transmission signal and the fourth transmission signal to restore the third image signal.

The foregoing and/or utilities and other aspects of the present general inventive concept may also be achieved by providing an image forming apparatus including a main controller to convert a plurality of image signals corresponding to printing data into differential signals and to combine the converted differential signals into a plurality of transmission signals; and a of first of ports formed on the main controller to transmit to the plurality of transmission signals from the main controller to a print engine unit.

The image forming apparatus may also include a plurality of transfer cables connected to the plurality of first ports of the main controller.

The plurality of image signals may be a first number and the plurality of ports may be a second number.

The first number may be different from the second number.

The print engine unit may restore the differential signals from the transmission signals to print an image according to the restored signals and comprises a plurality of second ports connected to the plurality of first ports to receive the plurality of transmission signals.

The foregoing and/or other utilities of the present general inventive concept may also be achieved by providing an image forming apparatus including a print engine unit having a plurality of ports formed thereon to receive the plurality of transmission signals, and to restore the plurality of transmission signals into a plurality of image signals by combining the transmission signals to print an image according to the restored image signals.

The image forming apparatus may also include a plurality of transfer cables to transmit the plurality of transmission signals from the plurality of ports to the print engine unit.

The image forming apparatus may also include a main controller to convert a plurality of image signals corresponding to printing data into a plurality of differential signals and to combine the plurality of differential signals to generate the transmission signals.

The foregoing and/or other utilities of the present general inventive concept may also be achieved by providing a main controller to convert a plurality of image signals corresponding to printing data into differential signals and to combine the converted differential signals into a plurality of transmission signals, a plurality of ports to receive and transmit the plurality of transmission signals from the main controller, and a print engine unit connected to the plurality of ports to receive the plurality of transmission signals, and to restore the plurality of transmission signals into a plurality of image signals by combining the transmission signals to print an image according to the restored signals.

Each of the differential signals may include a pair of low-voltage differential signals having a phase difference of 180°.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
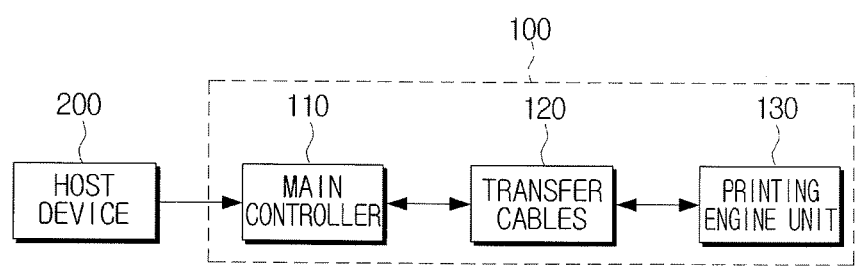
FIG. 1 is a block diagram illustrating an image forming apparatus according to an exemplary embodiment of the present general inventive concept.

Reference will now be made to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming apparatus according to an embodiment of the present general inventive concept. The image forming apparatus includes a main controller 110, transfer cables 120, and a printing engine unit 130.

The following description of the present general inventive concept according to the embodiment as illustrated in FIG. 1 is not limited to the specified order of processes as listed below. Accordingly, the processes as discussed herein are but one example of the process flow according to the embodiment as illustrated in FIG. 1.

The main controller 110 converts printing data received from a host device 200 into printable image data. The printable image data includes image signals that correspond to a font, and additional functions which are required to construct text, or images included in the printing data.

The main controller 110 converts the converted image signals of the printable image data into differential signals using low-voltage differential signaling (LVDS). LVDS uses two signal lines to convey information. Here, as discussed in further detail below, each image signal is converted into a low-voltage differential pair of signals. In particular, the image signals are converted into low-voltage differential signals having a phase difference of 180°, respectively.

The main controller 110 classifies the low-voltage differential signals into a predetermined number of groups. The predetermined number of groups may be, for example, according to color, font size, or font type. The main controller 110 then generates a transmission signal for each group of low-voltage differential signals by combining the respective low-voltage differential signals corresponding to the image signals within each group. The transmission signals are then distributed to the transfer cables 120. In other words, one transmission signal is generated for each image signal group including the converted low-voltage differential signals, and each transmission signal is transmitted to a respective transfer cable.

The transfer cables 120 connect the main controller 110 to the printing engine unit 130, and transmit the transmission signals between the main controller 110 and the printing engine unit 130.

The number of transfer cables 120 that are provided is equivalent to the number of transmission signals that are generated by the main controller 110 for each group of image signals as described above, but less than the total number of low-voltage differential signals. The number of image signals included within the printable image data are decided according to the specifications of the main controller 110 when the image forming apparatus 100 is designed. Accordingly, in addition to font sizes, functions required to construct text, and images included in the printing data as discussed above, the image signals may also include a control signal to control the printing engine unit 130 to perform a printing function thereof.

The printing engine unit 130 receives the transmission signals through the transfer cables 120, and restores the received transmission signals from low-voltage differential signals into image signals.

Figure 2:
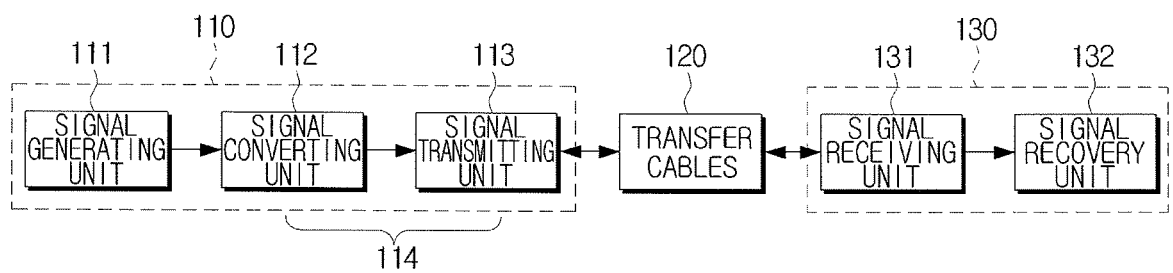
FIG. 2 is a block diagram illustrating the image forming apparatus of FIG. 1 according to the present general inventive concept.

FIG. 2 is a block diagram illustrating the image forming apparatus of FIG. 1. Referring to FIG. 2, the main controller 110 includes a signal generating unit 111, a signal converting unit 112, and a signal transmitting unit 113. The printing engine unit 130 includes a signal receiving unit 131 and a signal recovery unit 132.

The signal generating unit 111 converts the printing data received from the host device 200 into the printable image data which contains the plurality of image signals. The plurality of image signals of the printable image data have voltage pulse waveforms with amplitudes ranging from 3.3 volts DC to 5 volts DC.

The signal converting unit 112 converts the plurality of respective image signals into differential signals using LVDS. In particular, the differential signals may be a low-voltage differential signal pair including a differential signal D+ which is a low-voltage signal having the same phase as the image signal and a differential signal D− which has a phase difference of 180° with respect to the image signal.

The signal transmitting unit 113 classifies the differential signals D+ and D− converted by the signal converting unit 112, into a predetermined number of groups and combines the low-voltage differential signals within each group to generate a transmission signal for each group. The transmission signals are then distributed to the transfer cables 120. The differential signals may be classified into the predetermined number of groups according to image signal types. For example, if select low-voltage differential signals are classified into one group, the low-voltage differential signals in the group may be all related to color. Note that the signal converting unit 112 and the signal transmitting unit 113 may also be implemented as one operation. That is, signal converting unit 112 which converts the image signals into low-voltage differential signals and the signal transmitting unit 113 which classifies the low-voltage differential signals into like groups may perform their respective operations simultaneously by to effectively perform one seamless operation. Additionally the signal converting unit 112 and the signal transmitting unit 113 may be combined into a single unit to form a signal converting and transmitting unit 114. The signal converting and transmitting unit 114 as illustrated in FIG. 2 is illustrated as being part of the main controller 110, however, the present general inventive concept is not limited thereto. For example, the signal converting and transmitting unit 114 may also be disposed apart from yet connected to the main controller 110.

The signal transmitting unit 113 will be explained in detail with reference to FIGS. 3 and 4.

Figure 3:
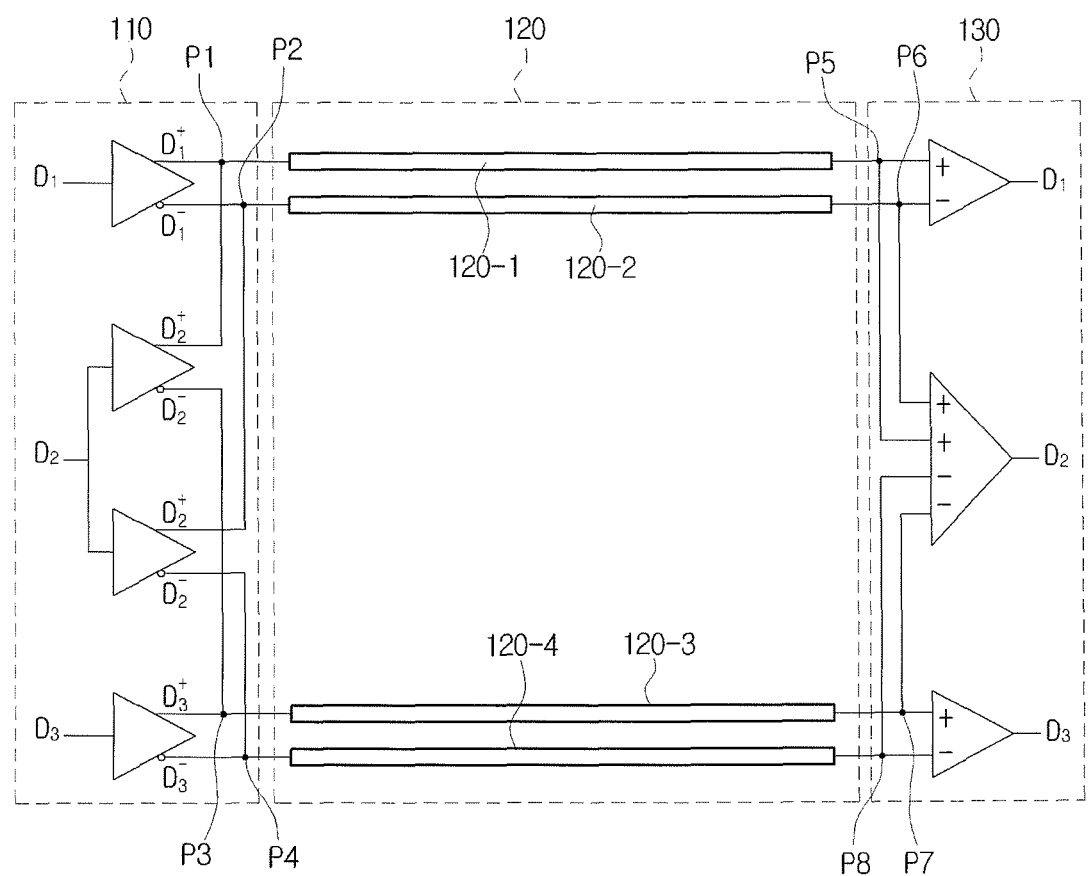
FIG. 3 is a schematic view illustrating a method of transmitting a signal of an image forming apparatus according to an embodiment of the present general inventive concept.
Figure 4:
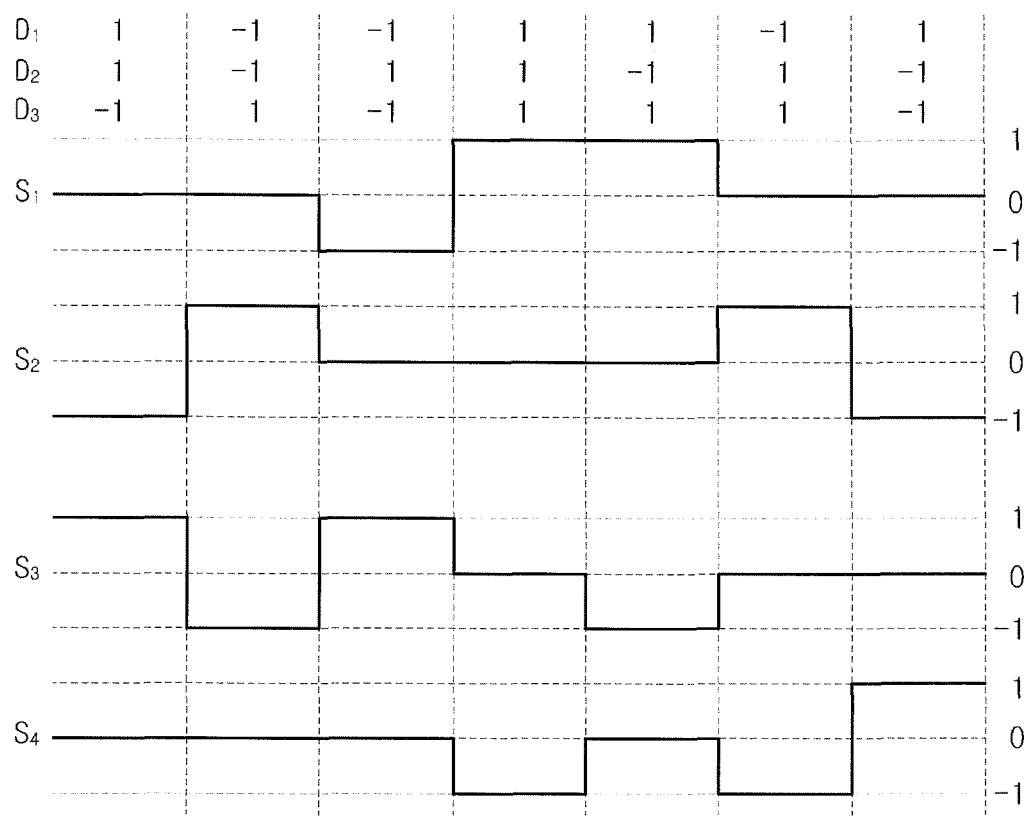
FIG. 4 is a wave form graph according to the method of transmitting a signal of FIG. 3.

FIG. 3 is a schematic view illustrating a method of transmitting a signal of an image forming apparatus according to an embodiment of the present general inventive concept, and FIG. 4 is a waveform graph illustrating the method of transmitting a signal as illustrated in FIG. 3. Here, the signal of the image forming apparatus may be the differential signals D+ and D−, classified in a predetermined number of groups.

Referring to FIG. 3, the plurality of image signals may include the first image signal D1, the second image signal D2, and the third image signal D3. Values of the respective signals may have pulse waveform values as illustrated in FIG. 4. That is, D1 may have values corresponding to 1, −1, −1, 1, 1, −1, and 1, D2 may have values corresponding to 1, −1, 1, 1, −1, 1, and −1, and D3 may have values corresponding to −1, 1, −1, 1, 1, 1, and −1.

Referring to FIG. 3, the converted low-voltage differential signals D+ and D− which correspond to the image signals of D1, D2, and D3 are generated in the main controller 110. Each image signal D1, D2, and D3 are converted from their respective pulse values into respective differential signal pairs of D+ and D−. Thus, the first image signal D1, having values of 1, −1, −1, 1, 1, −1, and 1, is converted into a first pair of low-voltage differential signals having first differential signal, D1+, and first differential signal, D1−, the second image signal D2, having the values of 1, −1, 1, 1, −1, 1, and −1, is converted into a second group of low-voltage differential signal having two second 2 differential signals, D2+, and two second differential signals, D2−, and the third image signal D3 is converted into a third group of low-voltage differential signal having three third differential signals, D3+, and three third differential signals, D3−.

The converted low-voltage differential signals are classified into like groups and further combined within each group to generate a transmission signal which will be described in further detail below.

A transmission signal is generated for each group of low-voltage differential signals by combining the low-voltage differential signals within each classified group. The generated transmission signals are then distributed to a plurality of transfer cables, 120-1 to 120-4.

For example, the first transmission signal S1 is generated by combining the first differential signal D1+ and the second differential signal D2+. The generated first transmission signal S1 is then transmitted to the printing control unit 130 through the first transfer cable 120-1. The second transmission signal S2 is generated by combining the first differential signal D1− and the second differential signal D2+. The generated second transmission signal S2 is then transmitted to the printing control unit 130 through the second transfer cable 120-2. The third transmission signal S3 is generated by combining the third differential signal D3+ and the second differential signal D2−. The generated third transmission signal S3 is then transmitted to the printing control unit 130 through the third transfer cable 120-3. The fourth differential signal S4 is generated by combining the third differential signal D3− and the second differential signal D2−. The generated fourth transmission signal S4 is then transmitted to the printing control unit 130 through the fourth transfer cable 120-4.

Thus, the first to fourth transmission signals, S1 to S4, are transmitted through the first to fourth transfer cables, 120-1 to 120-4, as illustrated in FIG. 4. Alternatively, three image signals may be transmitted using a total of four transfer cables.

That is, if three image signals are implemented for each of the Cyan C, Magenta M, Yellow Y, and Black K for high-speed printing, a conventional image forming apparatus requires 24 transfer cables (i.e., one cable for each converted low-voltage differential signal) but a method of transmitting a signal according to the present general inventive concept, as illustrated in FIG. 3, may instead be implemented using only 16 transfer cables (i.e., four cables for each combined low-voltage differential signal pair).

The signal receiving unit 131 in the printing engine unit 130 receives a transmission signal through each transfer cable, and the signal recovery unit 132 restores the received transmission signals into image signals.

In particular, the signal receiving unit 131 distributes the first to fourth transmission signals S1 to S4, which are transmitted through respective transfer cables 120-1 to 120-4, to the signal recovery unit 132 to restore the low-voltage differential image signals into image signals.

The signal recovery unit 132 performs the low-voltage differential signal to image signal restoration process by combining the transmission signals distributed by the signal receiving unit 131. For instance, the signal recovery unit 132 combines the first and second transmission signals S1 and S2 to restore the first image signal D1, combines the first to fourth transmission signals S1 to S4 to restore the second image signal D2, and combines the third and fourth transmission signals S3 and S4 to restore the third image signal D3.

In particular, referring to FIGS. 3 and 4, the first image signal D1 may be restored by subtracting the second transfer signal S2 from the first transfer signal S1. The second image signal D2 may be restored by subtracting the sum of the third transfer signal S3 and the fourth transfer signal S4 from the sum of the first transfer signal S1 and the second transfer signal S2. The third image signal D3 may be restored by subtracting the fourth transfer signal S4 from the third transfer signal S3.

Referring to FIG. 3, since each low-voltage differential signal pair have a phase difference of 180°, during the process of restoring the transmission signal into an image signal, noise added from the transfer cables 120-1 to 120-4 during the process of combining the two signals is removed.

The printing engine unit 130 may be a laser scanning unit cable of receiving more than three pairs of differential signals, according to an embodiment of the present general inventive concept.

The main controller 110 may have a plurality of first ports, for example, ports P1, P2, P3, and P4 connected to a first terminal of transfer cables 120-1 to 120-4 to receive the transmission signals S1 to S4 from the main controller 110 and to transmit the transmission signals S1 to S4 to a first end of each of the transfer cables 120-1 to 120-4. Additionally, the print engine unit 130 may have a plurality of second ports, for example, P5, P6, P7, and P8, connected to a second terminal of the transfer cables 120-1 to 120-4 to receive the transmission signals S1 to S4 from the main controller 110 via the transfer cables 120-1 to 120-4.

The present general inventive concept is not limited to the above example, and thus number of ports may vary for each of the first plurality of ports and the second plurality of ports. Each of the first plurality and second plurality of ports are dependent upon the number of transmission signals that are received. Thus, the number of ports for each of first and second plurality of ports is directly proportional to the number of transmission signals generated by the main controller 110.

Figure 5:
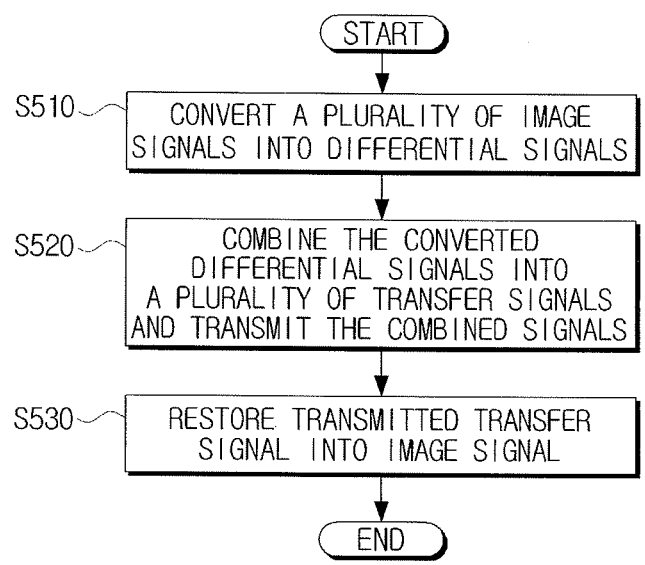
FIG. 5 is a flowchart illustrating a method of transmitting a signal of an image forming apparatus according to an embodiment of the present general inventive concept.

FIG. 5 is a flowchart illustrating a method of transmitting a signal of an image forming apparatus according to an embodiment of the present general inventive concept. Referring to FIG. 5, if printing data is received from a host device, the printing data is converted into printable image data. The printable image data includes image signals which correspond to a font and additional functions which are required to construct text, or image included in the printing data.

In operation S510, a plurality of image signals corresponding to the printing data are converted into low-voltage differential signals, respectively. The differential signal is an image signal which is converted using LVDS, and may be a low voltage differential signal pair including a low-voltage image differential signal D+ having the same phase as an image signal, and a low voltage differential signal D− having a phase difference of 180° from the image signal.

In operation S520, the converted low-voltage differential signals are combined, and the combined low-voltage differential signals are then transmitted to a plurality of transfer cables. In particular, the transmission signals are generated by classifying the low-voltage differential signals into groups and combining the converted low-voltage differential signals within each group to generate the transmission signals. The transmission signals are then distributed to the transfer cables 120-1-120-4. The differential signals may be classified into groups according to similarity. For example, if three image signals are generated for each of the colors C, M, Y, and K for high-speed printing, three pairs of differential signals for C may be combined and transmitted through four transfer cables.

In operation S530, the distributed transmission signals are restored into image signals. Since the low-voltage differential signals have a phase difference of 180° respectively, any noise added in the process of combining the signals is removed.

A method of transmitting a signal according to an embodiment of the present general inventive concept is also applicable when more than three pairs of differential signals are transmitted.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
   a main controller to convert a plurality of image signals corresponding to printing data into differential signals, to classify the differential signals into a plurality of groups by at least color, font size, and font type, and to combine the converted differential signals of each of the plurality of groups into a plurality of transmission signals;
   a printing engine unit to restore the image signals after the plurality of transmission signals are transmitted from the main controller; and
   a plurality of transfer cables to transmit the plurality of transmission signals between the main controller and the printing engine unit,
   wherein the number of transmission signals is less than the total number of differential signals.

2. The apparatus of claim 1, wherein the main controller comprises:
   a signal generating unit to convert the printing data into a plurality of image signals;
   a signal converting unit to convert the plurality of image signals into the differential signals using low voltage differential signaling (LVDS); and a signal transmitting unit to generate the plurality of transmission signals by combining the converted differential signals respectively, and to distribute the transmission signals to a plurality of respective transfer cables.

3. The apparatus of claim 2, wherein the signal transmitting unit combines two of the plurality of image signals to generate each of the transmission signals.

4. The apparatus of claim 2, wherein
the plurality of image signals comprise a first image signal, a second image signal, and a third image signal,
the signal converting unit converts the first image signal into a first 1+ differential signal and a first 1− differential signal, converts the second image signal into two second 2+ differential signals and two second 2− differential signals, and converts the third image signal into a third 3+ differential signal and a third 3− differential signal, and
the signal transmission unit combines the first 1+ differential signal and one second 2+ differential signal to generate a first transmission signal, combines the first 1− differential signal and another second 2+ differential signal to generate a second transmission signal, combines the third 3+ differential signal and one second 2− differential signal to generate a third transmission signal, and combines the third 3− differential signal and another second 2− differential signal to generate a fourth transmission signal.

5. The apparatus of claim 4, wherein the signal recovery unit combines the first transmission signal and the second transmission signal to restore the first image signal, combines the first transmission signal to the fourth transmission signal to restore the second image signal, and combines the third transmission signal and the fourth transmission signal to restore the third image signal.

6. The apparatus of claim 1, wherein the printing engine unit comprises:
a signal receiving unit to receive the transmission signals through the transfer cables; and
a signal recovery unit to restore the received transmission signals into a plurality of image signals.

7. A method of transmitting a signal comprising:
converting a plurality of image signals corresponding to printing data into differential signals;
classifying the differential signals into a plurality of groups by at least color, font size, and font type;
combining the converted differential signals of each of the plurality of groups into a plurality of transmission signals; and
restoring the image signal after the plurality of transmission signals are transmitted,
wherein the number of the combined transmission signals is less than the total number of differential signals.

8. The method of claim 7, wherein the converting a plurality of image signals converts the plurality of image signals into the differential signals using low voltage differential signaling.

9. The method of claim 7, wherein the combining the converted differential signals combines two of the plurality of image signals to generate each of the transmission signals.

10. The method of claim 7, wherein the plurality of image signals comprise a first image signal, a second image signal, and a third image signal,
the converting the plurality of image signals converts the first image signal into a first 1+ differential signal and a first 1− differential signal, converts the second image signal into two second 2+ differential signals and two second 2− differential signals, and converts the third image signal into a third 3+ differential signal and a third 3− differential signal, and
the combining the converted differential signal combines the first 1+ differential signal and one second 2+ differential signal to generate a first transmission signal, combines the first 1− differential signal and another second 2+ differential signal to generate a second transmission signal, combines the third 3+ differential signal and one second 2− differential signal to generate a third transmission signal, and combines the third 3− differential signal and another second 2− differential signal to generate a fourth transmission signal.

11. The method of claim 10, wherein the restoring the image signal combines the first transmission signal and the second transmission signal to restore the first image signal, combines the first transmission signal to the fourth transmission signal to restore the second image signal, and combines the third transmission signal and the fourth transmission signal to restore the third image signal.

12. An image forming apparatus comprising:
a main controller to convert a plurality of image signals corresponding to printing data into differential signals, to classify the differential signals into a plurality of groups by at least color, font size, and font type, and to combine the converted differential signals of each of the plurality of groups into a plurality of transmission signals;
a plurality of first ports formed on the main controller to transmit to the plurality of transmission signals from the main controller to a print engine unit; and
a plurality of transfer cables connected to the plurality of first ports of the main controller,
wherein the plurality of image signals is a first number, the plurality of ports is a second number, and the first number is different from the second number.

13. The image forming apparatus of claim 12, wherein the print engine unit restores the differential signals from the transmission signals to print an image according to the restored signals and comprises a plurality of second ports connected to the plurality of first ports to receive the plurality of transmission signals.

14. An image forming apparatus comprising:
a print engine unit having a plurality of ports formed thereon to receive the plurality of transmission signals, and to restore the plurality of transmission signals into a plurality of image signals by combining the transmission signals to print an image according to the restored image signals;
a plurality of transfer cables to transmit the plurality of transmission signals from the plurality of ports to the print engine unit; and
a main controller to convert a plurality of image signals corresponding to printing data into a plurality of differential signals, to classify the differential signals into a plurality of groups by at least color, font size, and font type, and to combine the plurality of differential signals of each of the plurality of groups to generate the transmission signals.

15. An image forming apparatus comprising:
a main controller to convert a plurality of image signals corresponding to printing data into differential signals, to classify the differential signals into a plurality of groups by at least color, font size, and font type, and to combine the converted differential signals of each of the plurality of groups into a plurality of transmission signals;

a plurality of ports to receive and transmit the plurality of transmission signals from the main controller; and a print engine unit connected to the plurality of ports to receive the plurality of transmission signals, and to restore the plurality of transmission signals into a plurality of image signals by combining the transmission signals to print an image according to the restored signals.

16. The image forming apparatus of claim 15, wherein each of the differential signals include a pair of low-voltage differential signals having a phase difference of 180°.

17. A method of transmitting a signal comprising:

converting printable image data corresponding to image signals into differential signals;

classifying the differential signals into a predetermined number of groups by at least color, font size, and font type;

generating at least one transmission signal for each group of classified differential signals by combining the respective differential signals corresponding to the image signals within each group; and transmitting the generated at least one transmission signal.

18. An image forming apparatus comprising:

a main controller to convert printable image data corresponding to image signals into differential signals, classify the differential signals into a predetermined number of groups by at least color, font size, and font type, generate a transmission signal for each group of classified differential signals by combining the respective differential signals corresponding to the image signals within each group, and to transmit the generated transmission signal;

a printing engine unit to restore the image signals when the at least one transmission signal is received from the main controller; and a plurality of transfer cables to transmit the at least one transmission signal between the main controller and the printing engine unit.

* * * * *